(No Model.)
J. A. MALONEY & C. H. KOYL.
PLATE FOR SECONDARY BATTERIES.
No. 266,172. Patented Oct. 17, 1882.
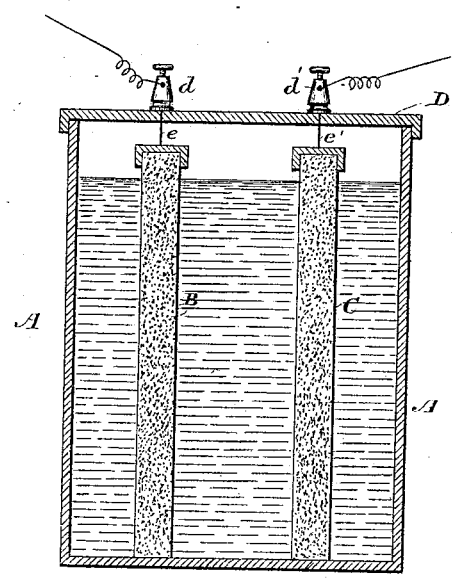
WITNESSES
J. Walter Blandford.
W. C. Chapple
INVENTORS
James A. Maloney,
Charles H. Koyl.
By their Attorney
Marcellus Bailey

United States Patent Office.

JAMES A. MALONEY, OF WASHINGTON, DISTRICT OF COLUMBIA, AND CHARLES H. KOYL, OF COBOURG, ONTARIO, CANADA, ASSIGNORS TO THE AMERICAN ELECTROPHORE COMPANY, OF WASHINGTON, D. C.

PLATE FOR SECONDARY BATTERIES.

SPECIFICATION forming part of Letters Patent No. 266,172, dated October 17, 1882.

Application filed September 26, 1882. (No model.)

*To all whom it may concern:*

Be it known that we, JAMES A. MALONEY, of Washington, District of Columbia, and CHARLES H. KOYL, of Cobourg, Province of Ontario, Canada, (temporarily residing in Baltimore, Maryland,) have invented certain new and useful Improvements in Plates for Secondary Batteries, of which the following is a specification.

In an application for Letters Patent filed October 28, 1881, Serial No. 44,710, we have described and claimed an invention in secondary batteries, which consists in forming the plates of the battery of a porous material primarily permeated with a solid polarizable substance.

Our present invention has relation to this form of plate; and it consists in certain improvements which have relation to the special material used for making the plates, to the kind of polarizable substance with which the respective plates are permeated, and to the method of introducing the substance into the pores of the plates.

The accompanying drawing represents a battery-jar, A, containing porous plates B C, prepared in accordance with our invention, and provided with electrodes e e', which connect with the binding-posts d d' on the cover D of the jar in the usual way. The porous plates are made of carbon—for instance, coke or charcoal. This material is porous, so as to permit it to absorb the polarizable substance in large quantity, thus greatly increasing the storage capacity of the plates without increasing their bulk. They are also very light, by which we decrease the weight of the battery, avoiding particularly the great weight consequent upon the use of solid metallic plates. These plates can be permeated by any suitable solid polarizable substance. In practice, with a view to more readily forming the plates, we use for the one plate a comparatively high oxide—such as the peroxide of lead—and for the other a lower form of oxide—as, for instance, red lead; or, as an equivalent, we may use lead in a powdered state. The peroxide of lead is mixed with water; so, also, is the red lead, the two mixtures being of course kept separate.

In order to drive the air from the plates, so that the mixtures may enter therein, instead of forming a mere surface-coating thereon, we first heat said plates sufficiently to expel the air from the pores or cells, and then quickly submerge them in their respective mixtures; or each plate may form a diaphragm, above which the liquid mixture is placed—for instance, it may be the bottom of a box or holder containing the mixture—and below which is a suction device to exhaust the air. By the action of this device the mixture will be drawn into the plate, the water passing through said plate, while the solid particles of peroxide or red lead, as the case may be, remain in the pores or passage of the same; or the air can be exhausted or expelled from the plates and the polarizable substance can be caused to enter the same in other ways, which will readily suggest themselves. We do not confine ourselves, therefore, to any special method of procedure in this regard.

We do not here claim broadly a porous plate for secondary batteries whose pores or cells contain a solid polarizable substance; but

What we claim is—

1. A porous carbon plate for secondary batteries primarily permeated or filled with a solid polarizable substance, substantially as hereinbefore set forth.

2. The combination, in a secondary battery, of two porous plates having their pores or cells primarily filled, the one with peroxide of lead or other higher form of lead oxide, the other with a lower form of lead oxide, substantially as hereinbefore set forth.

3. The method of preparing porous plates of secondary batteries, consisting in exhausting or expelling the air from their pores or cells, and then filling said plates with a solid polarizable substance, substantially as hereinbefore set forth.

In testimony whereof we have hereunto set our hands.

JAMES A. MALONEY.
CHARLES H. KOYL.

Witnesses to signature of Jas. A. Maloney:
J. WALTER BLANDFORD,
M. BAILEY.

Witnesses to signature of Charles H. Koyl:
EWELL A. DICK,
J. WALTER BLANDFORD.